Aug. 18, 1931. E. F. ROSSMAN 1,819,523

SHOCK ABSORBER

Filed Dec. 26, 1929

Inventor
EDWIN F. ROSSMAN
By Spencer, Hardman and Jehu
Attorneys

Patented Aug. 18, 1931

1,819,523

UNITED STATES PATENT OFFICE

EDWIN F. ROSSMAN, OF DAYTON, OHIO, ASSIGNOR TO DELCO PRODUCTS CORPORATION OF DAYTON, OHIO, A CORPORATION OF DELAWARE

SHOCK ABSORBER

Application filed December 26, 1929. Serial No. 416,346.

This invention relates to improvements in double-acting hydraulic shock absorbers.

It is among the objects of the present invention to provide a double-acting hydraulic shock absorber adapted to control both the compression and rebound movements of vehicle springs whereby sudden jars and jolts, caused by the uncontrolled movement of the vehicle springs, will be substantially eliminated.

A further object of the invention is to provide the shock absorber with a fluid pressure release device of simple structure and design, adapted to establish restricted flows of fluid through certain portions of the shock absorber in two directions.

Further objects and advantages of the present invention will be apparent from the following description, reference being had to the accompanying drawings wherein a preferred embodiment of one form of the present invention is clearly shown.

Figure 1:
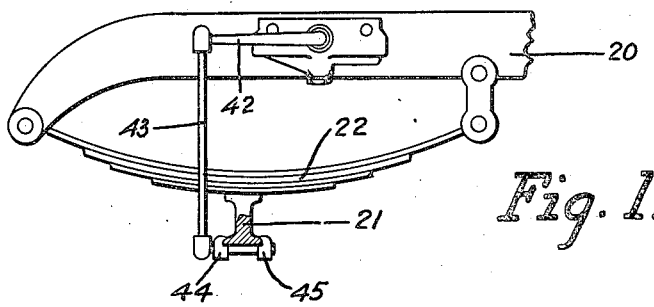
Fig. 1 illustrates a fragmentary side view of a vehicle chassis equipped with a shock absorber including the improved device. The vehicle wheels supported upon the axle are omitted for the sake of clearness.

Referring to the drawings, the numeral 20 designates the frame of the vehicle upon which the body (not shown) is carried. Frame 20 is supported upon the axle 21 by vehicle springs 22, which are hingedly secured to the frame in any suitable manner.

The shock absorber comprises a casing 23 having apertures 24 for receiving bolts or studs by which the shock absorber is secured to the frame 20. The shock absorber casing 23 presents a fluid reservoir 25 and a cylinder 26. The ends of the cylinder 26 are provided with screw plugs 27, properly gasketed, whereby the cylinder ends are closed. Within the cylinder there is provided a fluid displacement member 28, having head portions at its opposite ends providing piston heads 29 and 30 respectively. The piston head 29 forms a compression chamber 31 at its end of the cylinder, while piston head 30 forms a compression chamber 32 at its respective end of the cylinder. The piston head portions 29 and 30 are joined by an intermediate web portion 33. Each piston head portion 29 and 30 is provided with a through passage 34. The adjacent ends of the through passages 34 of the piston head portions 29 and 30 receive wear pieces 35, each having a shank portion extending into the respective passages 34. At the outer or opposite ends of the respective passages 34, screw threads are provided, each being adapted to receive a valve cage 36, each having a valve seat for a ball check valve 37 yieldably urged into engagement with the seat by the spring 38 provided in the cage. In each passage 34 a spring 39 is interposed between the respective valve cage 36 and the respective wear piece 35. These springs yieldably urge the respective wear pieces 35 into engagement with the free end of the rocker lever 40, thus compensating for any wear of either the rocker lever or the wear pieces.

The rocker lever is secured to a rocker shaft 41, properly journalled in bearings provided by the casing 23. The rocker shaft 41 has its one end extending outside of the casing and having the shock absorber operating arm 42 provided thereon, the free end of which operating lever is swivelly secured to the link rod 43. The other end of the link rod is swivelly secured to a member 44 which is anchored to the axle 21 by a clamping device 45.

From the aforegoing it may be seen that the fluid displacement member 28 is operatively connected with the axle 21 through the rocker arm 40, shaft 41, shock absorber operating arm 42 and the link rod 43. It will also be observed that as the springs 22 are flexed upwardly toward the frame 20, the shaft 42 will be rotated in a clockwise direction, causing the fluid displacement member 28 to move toward the left as regards Fig. 2, while in response to rebounding movements of springs 22 that is, movements of the springs 22 away from the frame 20, a counter-clockwise rotation of the shaft 41 obtains, resulting in a movement of the fluid displacement member 28 toward the right as regards Fig. 2.

The valves, including the ball check valves 37 in the respective piston head portions 29 and 30, act as replenishing valves to compensate for any fluid loss within the compression chambers, these valves functioning to establish fluid flows when their respective piston head portions move away from their respective cylinder ends.

In the casing 23 there is provided a valve chamber 50, the outer open end of which is screw-threaded for receiving a plug 51. Plug 51 is provided with a recess 52, forming a cylindrical portion 53 on the plug which extends into the valve chamber 50. Within the recess 52 and adjacent the bottom thereof, there is provided an annular ridge or ledge 54, forming an annular valve seat within said recess. A lateral opening 55, provided in the cylindrical portion 53 of the plug, communicates with a duct 56 which opens into the compression chamber 31. A similar duct 57 leads from the inner end of the valve chamber 50 to the compression chamber 32. The inner end of the cylindrical extension 53 provides a valve seat designated by the numeral 58.

Figure 2:
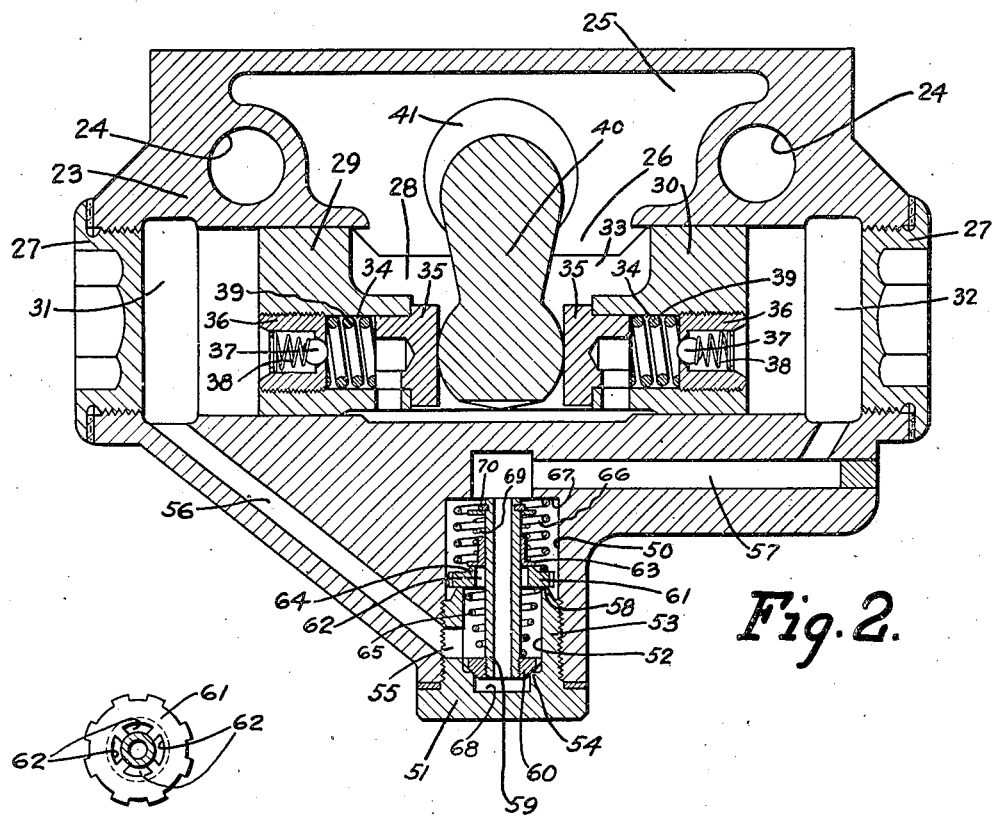
Fig. 2 is a longitudinal sectional view taken through the center of the shock absorber.

A fluid pressure release device is provided within the valve chamber 50, this fluid release device including three valves. One of these valves comprises a tubular member 59 having a head member 60 attached to its one end in any suitable manner, said head member being adapted, as shown in Fig. 2, to engage with the valve seat provided by the annular ledge 54 within the recess 52 of the plug 51.

Figure 3:
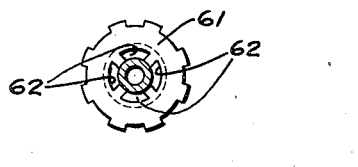
Fig. 3 is a plan view of the disc valve of the pressure release device.

Another valve of the fluid pressure release device is the disc valve 61, a flat view of which is shown in the Fig. 3. This valve is slidably supported upon the tubular portion 59 of the first mentioned valve, as shown in the Fig. 2. Disc valve 61 is adapted to engage the valve seat 58 provided by the end of the cylindrical portion 53 of the plug 51. A plurality of apertures 62 are provided in the disc valve 61 about the tubular portion 59 upon which said disc valve is supported, said apertures 62 lying within the confines of the valve seat 58. A third valve 63 is included in the pressure release device, this valve also being slidably supported upon the tubular member 59 of the first mentioned valve and being adapted to engage the disc valve 61 normally to close the aperture 62 therein. It will be seen that the valve 63 engages the side of the valve 61 opposite the valve seat 58. On this side of the disc valve 61 an annular ledge 64 is provided which forms the valve seat for the valve 63.

Figure 4:
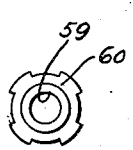
Fig. 4 is a similar view of another valve of the pressure release device.

A coil spring 65 surrounds the tubular portion 59 of the one valve, one end of said spring engaging with the disc valve 61, the other engaging the valve head 60. A spring 66 of greater tension than the spring 65 is interposed between the disc valve 61 and a shoulder 67 provided in the valve chamber 50, said spring urging the disc valve 61 against its valve seat 58. From this it may be seen that the spring 65 being of lesser tension than the spring 66 will naturally urge the valve head 60 into engagement with its valve seat 54. It will also be noted that a chamber 68 is provided in the recess of the plug 51 beneath the valve head 60, or more specifically between the outer surface of the valve head 60 and the bottom surface of the recess 52 in the plug 51. The numeral 69 designates a third spring of the fluid pressure release device, this spring being interposed between washers 70 supported on the end of the tubular member 59 and the valve 63, said spring 69 yieldably urging the valve 63 into engagement with its valve seat 64 provided on the disc valve 61. In the Fig. 4 an end view of the tubular valve comprising members 59 and 60 is shown. Both valves 60 and 61 are provided with recesses about their peripheral edge, the tangs between said recesses acting to guide the valves along the inner walls of the chamber within which they are contained, the recesses providing suitable fluid passages between the valves and said walls when said valves are moved by pressure to establish fluid flows.

The device functions as follows:

When the road wheels (not shown) strike an obstruction, springs 22 are flexed toward the frame 20 and upon this their compression movement, link rod 43 will be moved due to its being connected to the axle 21 and the axle in turn with the springs 22 so that the fluid displacement member 28 will be moved toward the left as regards Fig. 2. Fluid within the compression chamber 31 will be forced through the duct 56 and lateral passage 55 in plug 51 into the recess 52 of said plug, this pressure being exerted upon the inner surface of valve 60 and thus urging said valve into tighter engagement with its valve seat 54. If this pressure is of comparatively small value or confined within certain limits, it will alone move the valve 63 against the effect of spring 69 to establish a flow of fluid from the recess 52 through the apertures 62 in the disc valve 61 and thence through the valve chamber 50 into the duct 57 and the compression chamber 32. If on the other hand the fluid pressure is of a greater value or is excessively high, then disc valve 61 will also be moved from its seat, whereby a fluid flow is established from the recess 52 between the valve seat 58 and valve 61 and then into the valve chamber 50, through duct 57 into the compression chamber 32. Both of these flows will be restricted and consequently compression movement of the spring 22 toward the frame 20 will be resisted, thereby cushioning shocks caused by the striking of the obstruction.

As soon as the springs 22 have reached the limit of their flexure caused by the obstruction being met, they will have a tendency to return to unflexed position with a sudden, rebounding movement if not properly checked or controlled. The present device prevents the return of the springs 22 with a rebounding movement. As the springs 22 begin to move toward their normal position, the link rod 43 will cause the fluid displacement member 28 to be moved toward the right as regards Fig. 2, and thus pressure will be exerted upon the fluid within the compression chamber 32, which pressure is exerted through the duct 57 into the valve chamber 50. Valves 63 and 61 now having pressure exerted upon the side with which their springs engage, will be moved more tightly upon their valve seats. Pressure will also be exerted upon the inner end of the tubular member 59 which forces said member toward the valve seat 54. However, pressure will also be exerted through the tubular member 59 into the chamber 68 and against the outer surface of the tubular member 59 and the valve head 60. The differential in pressure exerted against both ends of the tubular valve will cause this tubular valve to move away from the valve seat 54 against the effect of its spring 65 and thus there will be established a fluid flow from the duct 57 through the tubular portion 59 of the tubular valve into the chamber 68 and thence through the space provided between the valve seat 54 and the valve head 60 into the recess 52 and thence through opening 55 and duct 56 into the compression chamber 31.

Applicant has provided a shock absorber with a fluid pressure release device of simple structure and design, capable of being produced commercially at a minimum expenditure of material and labor, said pressure release device being easily accessible for the substituton of springs. It may readily be understood that the substitution of lighter springs will cause the shock absorber to establish fluid flows at lighter pressures and thus not be as effective to resist spring movements as when heavier springs are provided.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a piston in the cylinder forming a compression chamber at each end thereof; a valve-chamber; separate ducts connecting the respective compression chambers with the valve chamber; and a compound pressure release device within the valve chamber adapted to establish restricted flows of fluid from one or the other compression chambers into the one at the opposite end of the cylinder, said device comprising spring loaded valves all operating in the same direction to establish their respective fluid flows, certain of said valves being supported by others.

2. A shock absorber comprising in combination, a casing presenting a fluid reservoir and a cylinder; a piston in the cylinder forming a compression chamber at each end thereof; a valve-chamber; separate ducts connecting the respective compression chambers with the valve chamber; and a compound pressure release device within the valve chamber adapted to establish restricted flows of fluid from one or the other compression chambers into the one at the opposite end of the cylinder, said device comprising spring loaded valves all operating in the same direction to establish their respective fluid flows, the one valve, adapted to establish a flow between the compression chambers in the one direction, supporting the valves adapted to establish the flow between the compression chambers in the opposite direction.

3. A shock absorber comprising in combination, a casing presenting a fluid reservoir and a cylinder; a piston in the cylinder forming a compression chamber at each end thereof; a valve chamber; separate ducts connecting the respective compression chambers with the valve chamber; and a compound pressure release device within the valve chamber said device comprising a plurality of valve members all adapted to operate in the same direction to establish fluid flows between the compression chambers in opposite directions, the one valve member slidably supporting the valve members adapted to establish flows of fluid opposite to that of said supporting valve member, and springs yieldably urging said valve members into normally closed positions.

4. A shock absorber comprising in combination, a casing presenting a fluid reservoir and a cylinder; a piston in the cylinder forming a compression chamber at each end thereof; a valve chamber; separate ducts connecting the respective compression chambers with the valve chamber; and a compound pressure release device within the valve chamber, said device comprising a plurality of valve members all adapted to operate in the same direction to establish fluid flows between the compression chambers in opposite directions, the one valve member slidably supporting the valve members adapted to establish flows of fluid opposite to that of said supporting valve member, and springs yieldably urging said valve members into normally closed positions, one of said springs being interposed between the one valve and the valve slidably supported on said valve, all of said springs differing substantially in tension.

5. A shock absorber comprising in combination, a casing presenting a fluid reservoir and a cylinder; a piston in the cylinder forming a compression chamber at each end thereof; a valve chamber; separate ducts connecting the respective compression chambers with the valve chamber; and a compound pressure release device within the valve chamber, said device comprising a plurality of valve members all adapted to operate in the same direction to establish fluid flows between the compression chambers in opposite directions, the one valve member slidably supporting the valve members adapted to establish flows of fluid opposite to that of said supporting valve member, and springs yieldably urging said valve members into normally closed positions, one of said springs being interposed between the one valve and the valve slidably supported on said valve, the spring urging the said slidably supported valve into closing position, being of substantially greater tension than the spring interposed between the valves.

6. A shock absorber comprising in combination, a casing presenting a fluid reservoir and a cylinder; a piston in said cylinder, forming a compression chamber at each end thereof; a valve chamber; separate ducts connecting the respective compression chambers with the valve chamber; a pressure release device within said valve chamber adapted, in response to proper fluid pressures in one or the other compression chamber, to establish a flow of fluid through said ducts in one or the other direction respectively, said device comprising a plurality of spring loaded valves, one of which is adapted to establish a flow of fluid through said ducts in the one direction, the others, supported by said valve, being adapted successively to establish flows of fluid through said ducts in the opposite direction.

7. A shock absorber comprising in combination, a casing presenting a fluid reservoir and a cylinder; a piston in the cylinder forming a compression chamber at each end thereof; a valve chamber in the casing; a duct leading from one compression chamber into one end of the valve chamber; a duct leading from the other compression chamber into the opposite end of the valve chamber; and a compound pressure release device within the valve chamber adapted, in response to proper fluid pressure to establish restricted flows of fluid between the two compression chambers, said device comprising a tubular valve adapted to establish a flow of fluid between the compression chambers in one direction, and a plurality of valve members carried by the tubular valve to establish flows of fluid between said chambers in the opposite direction.

8. A shock absorber comprising in combination, a casing presenting a fluid reservoir and a cylinder; a piston in the cylinder forming a compression chamber at each end thereof; a valve chamber in the casing; a duct leading from one compression chamber into one end of the valve chamber; a duct leading from the other compression chamber into the opposite end of the valve chamber; and a compound pressure release device within the valve chamber adapted, in response to proper fluid pressure to establish restricted flows of fluid between the two compression chambers, said device comprising a tubular valve adapted in response to differential pressures at its opposite ends, to establish a flow of fluid between the compression chambers in the one direction, and valves slidably supported upon said tubular valve, said valves cooperating, successively to establish restricted flows of fluid between the said chambers in the opposite direction.

9. A shock absorber comprising in combination, a casing presenting a fluid reservoir and a cylinder; a piston in the cylinder forming a compression chamber at each end thereof; a valve chamber; a recessed plug in the end of the valve chamber, providing two annular valve seats the plug having a lateral opening intermediate the valve seats; a valve adapted to engage one of said valve seats, said valve having a tubular stem; a disc-valve slidably carried by the tubular stem of the other valve and adapted to engage the other valve seat, said disc-valve having apertures therethrough; a second valve slidably supported upon the tubular stem and adapted to engage the disc-valve to close the apertures therein; springs of different tension yieldably urging the valves into engagement with their respective valve seats and ducts in the casing one of which connects one compression chamber with the valve chamber on one side of the disc valve, another duct connecting the other compression chamber with the lateral aperture in the plug.

10. A shock absorber comprising in combination, a casing presenting a fluid reservoir and a cylinder; a piston in said cylinder forming a compression chamber at each end thereof; a valve chamber in the casing; a duct connecting one compression chamber with the inner end of the valve chamber; another duct connecting the other compression chamber with the valve chamber adjacent its outer open end; a plug having a recess providing a cylindrical portion adapted to fit into the open end of the valve chamber, said cylindrical portion having a lateral opening in communication with the last mentioned duct; an annular ledge within the recess of the plug, providing a valve-seat; a valve-seat formed by the end of said cylindrical portion of the plug; a valve comprising a tubular body having a flange at its end forming the head of the valve which is adapted to engage the valve-seat within the recess; a disc-valve slidably supported on the tubular portion of the aforementioned valve and adapted to engage the valve-seat provided by the end of the plug, said disc-valve having apertures about the tubular support and within the confines of its seat; a second valve slidably carried by said tubular portion and adapted to engage the disc valve to close its apertures; a spring interposed between the head portion on the tubular valve and the disc valve, yieldably urging said head portion into seating engagement with the annular ledge in the plug; a spring of greater tension than the aforementioned spring urging the disc valve into engagement with the end of the plug; and a spring of less tension than the aforementioned springs urging the second valve on the tubular portion into engagement with the disc valve.

In testimony whereof I hereto affix my signature.

EDWIN F. ROSSMAN.